United States Patent [19]

Behringer

[11] Patent Number: 4,836,292
[45] Date of Patent: Jun. 6, 1989

[54] METHOD FOR COOLING A NUCLEAR REACTOR AND A PRODUCT THEREFOR

[76] Inventor: Cecil R. Behringer, 4204 Mavelle Dr., Edina, Minn. 55436

[21] Appl. No.: 33,013

[22] Filed: Mar. 31, 1987

[51] Int. Cl.⁴ .............................................. A62C 1/14
[52] U.S. Cl. ...................................... 169/47; 169/49; 169/70; 169/36; 244/136; 220/901; 376/279
[58] Field of Search ..................... 169/43–49, 169/36, 54, 70, 53; 244/136; 376/279, 277; 252/8, 2; 220/901

[56] References Cited

U.S. PATENT DOCUMENTS

| | | | |
|---|---|---|---|
| 2,003,300 | 6/1935 | Meigs | 169/36 |
| 2,359,573 | 10/1944 | MacKay | 169/53 X |
| 2,515,832 | 7/1950 | Mournaud | 169/36 |
| 2,895,693 | 7/1959 | Portias | 244/136 |
| 3,410,443 | 11/1968 | Hofman | 220/901 X |
| 3,442,334 | 5/1969 | Gousetis | 244/136 X |
| 3,765,558 | 10/1973 | Withers | 220/901 X |
| 3,900,366 | 8/1975 | Sakaguchi | 376/277 X |
| 3,963,626 | 6/1976 | Schmitt | 376/279 X |
| 4,226,727 | 10/1980 | Tarpley, Jr. et al. | 252/8 |
| 4,234,432 | 11/1980 | Tarpley, Jr. et al. | 252/8 |
| 4,652,383 | 3/1987 | Tarpley, Jr. et al. | 252/8 |

FOREIGN PATENT DOCUMENTS

| | | | |
|---|---|---|---|
| 406178 | 12/1966 | Australia | 252/2 |
| 470442 | 1/1951 | Canada | 169/36 |
| 2315290 | 2/1977 | France | 169/47 |
| 117889 | 9/1979 | Japan | 376/279 |
| 1092536 | 11/1967 | United Kingdom | 376/279 |
| 1307683 | 2/1973 | United Kingdom | 376/279 |

OTHER PUBLICATIONS

Factory Mutual Research Corp., Survey of Suppression of Sodium Fires In Liquid Metal Fast Breeder Reactors, 6/2/76.

*Primary Examiner*—Sherman D. Basinger
*Assistant Examiner*—James M. Kannofsky
*Attorney, Agent, or Firm*—John C. Barnes

[57] ABSTRACT

A method and product for use in smothering a nuclear fire resulting from an accident in a nuclear plant comprises the discharging onto the fire liquified inert gas, e.g. argon, so the gas will block the flow of oxygen to the fire. The liquified argon may be contained in reinforced allantoidal casings.

8 Claims, 1 Drawing Sheet

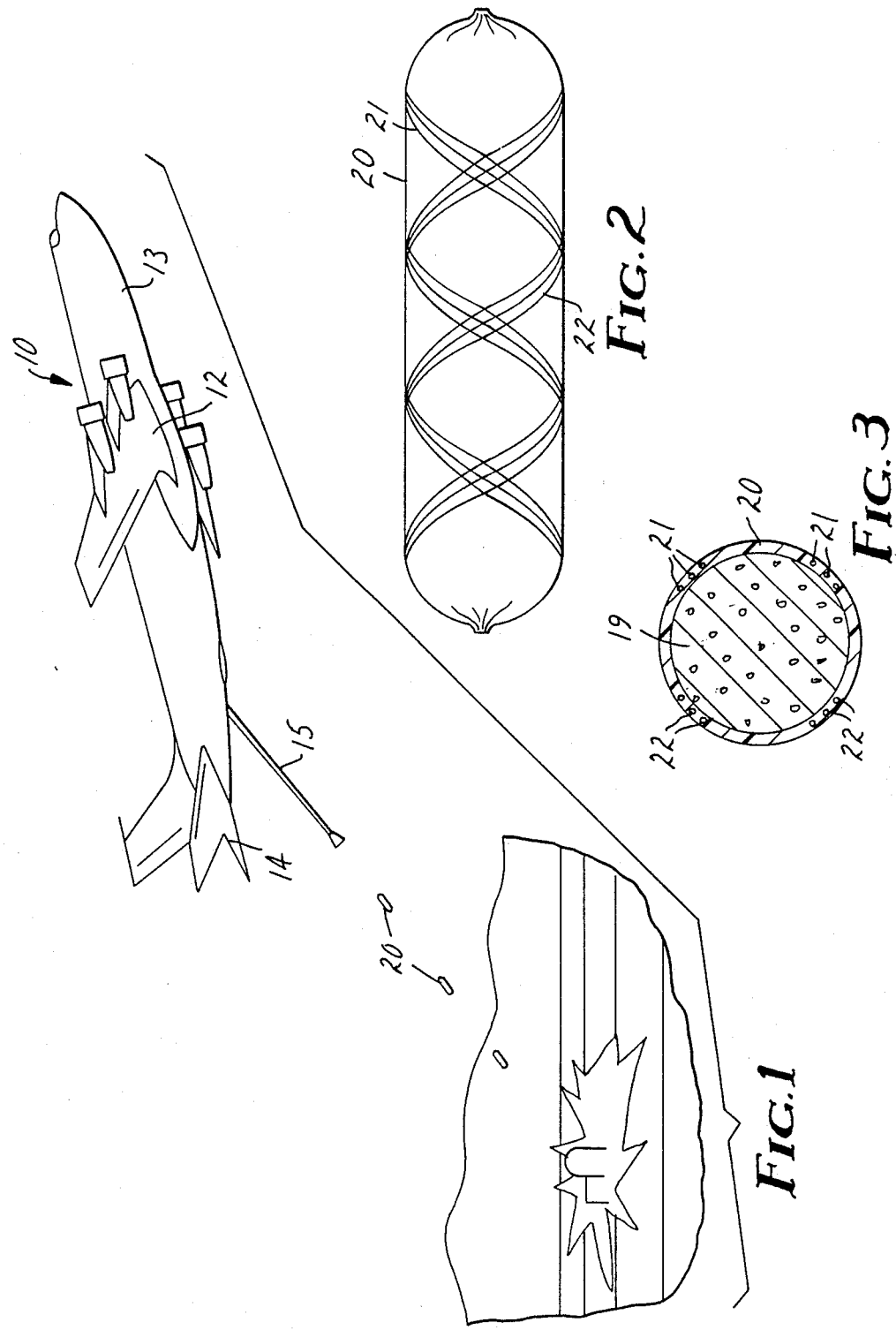

METHOD FOR COOLING A NUCLEAR REACTOR AND A PRODUCT THEREFOR

BACKGROUND OF THE INVENTION

1. Field of the Invention

This invention relates to a method for smothering a nuclear fire resulting from a nuclear explosion, and in one aspect, to a product for use in smothering or occuling the oxygen from reaching a nuclear "melt-down" situation.

2. Description of the Prior Art

There are not many prior experiences with the extinguishing or cooling of melt-down situations resulting from overheating, an explosion, or other accident which may take place in a nuclear power electricity generating plant.

The struggles recently experienced by the Russians in cooling the reactor at Chernobyl was to use radio-controlled earth-moving equipment to dump thousands of pounds of sand over the fire. The intense heat of the fires and the radiation resulting from such nuclear fires generates heat in the range of 20,000° F. and extracts such levels of radiation that the sand placed over the fire is radio active to a dangerous level. While this system possibly reduces the spread of radiation into the atmosphere, it leaves a very hazardous environmental condition, i.e., thousands of pounds of radio active sand and other particles.

The present invention would afford rapid lowering of the temperature of the nuclear fire, reducing it to a level to afford more effective extinguishing measures. This would require additional applications of the argon gas from the ground in the area of the fire until it is cooled and the two elements causing the fire are mechanically separated.

The method of the present invention provides a safe method for smothering the reaction of a nuclear accident and can result in reducing danger to human lives to effect initial smothering of the fire.

The product of the present invention is one which may be readily prepared and produced for application in the result of an emergency, and the materials for use in the manufacture of the product can be prepared and maintained on hand in the event an emergency condition should arise.

SUMMARY OF THE INVENTION

The method of the present invention comprises the plating of a tanker airplane with a material to effectively reflect radiation, particularly in the visible and infrared wavelengths of the spectrum, resulting from the nuclear fission. The tanker aircraft could be one of the refueling type, identified as a KC-135 refueling tanker aircraft. A gold plating applied to the undersurface of such an aircraft would protect the aircraft. The plating is done on a tankless method such as by the Dalic process as owned by Sifco Meta Chemical Company of Cleveland, Ohio. This coating would have a thickness of about 0.0002 inch of pure gold. An alternative system is a brush-plating system having a military specification. The plated aircraft is flown over the damaged reactor by autopilot or robotically, at about 40,000 feet, and casings of a liquified inert gas are discharged from the tanker to drop onto the damaged reactor.

The argon gas is first liquified and then the liquid inert gas is thickened by the use of "Carbopol" resins, Carbopol is a trademark of B. F. Goodrich, as a thickening agent to make the same in the form of a gel. The gel is encased in the special casings. The encased gel is discharged, such as through the snorkel of the refueling tanker aircraft to fall onto the damaged reactor. The dropping of the encased gelled inert gas filled casings would break the casings and soon the gelled liquid inert gas would turn to gaseous form and settle on the area and hence cool the reactor fire by choking the fire since it is heavier than air and inert. The blanket formed by the inert gas keeps out the oxygen which normally perpetuates the fission process.

The product comprises an allantoic-shaped casing. The casing is formed of a polymeric material which is fiber-reinforced to give the casing integrity when frozen. The casing will be of a size and shape to move through the snorkel of the refueling tanker aircraft. A preferred composition of liquid inert gas, for example, argon, is mixed with a thickening and suspending agent such as "Carbopol" resins to form a gelled liquid inert gas which is maintained at $-400°$ F. and placed in the casings. The casings are maintained at the super-cooled temperatures and can be placed aboard the aircraft and maintained at a temperature below $-400°$ F. during transport to the reactor site where they are discharged through the snorkel onto the reactor.

BRIEF DESCRIPTION OF THE DRAWINGS

The present invention will be further described with reference to the accompanying drawing wherein:

FIG. 1 is a schematic view of an aircraft passing over a damaged reactor involved in a melt-down situation;

FIG. 2 is a side elevational view of a casing according to the present invention; and FIG. 3 is a transverse sectional view of the casing.

DESCRIPTION OF THE PREFERRED EMBODIMENT

This invention is directed to a process and product for use in cooling down a fire resulting from nuclear fision which may result from some accident occuring within a nuclear reactor in an electricity generating plant or the like. Such fires or nuclear melt-downs result in fires having enormous brilliance and excessive heat, in addition to the discharge of radio-active radiation resulting from the continued feeding of this nuclear fire by the materials adjacent to the fire.

In order to reach the environment of such a fire, it would be necessary to shield any vehicle from the heat of the radiation expended. Thus, in the practice of this invention, it is proposed that a refueling tanker aircraft such as the KC-135 refueling tanker aircraft be used to fly over the fire. Such an act would be very difficult because it is really not known what the structural damage might be to such an aircraft, but, to minimize such damage, it is considered that the bottom of the aircraft should be plated with pure gold using a tankless plating system to apply the gold to the entire undersurface of the aircraft. As viewed in FIG. 1, the aircraft 10 could have the gold plating applied on the undersurface, as indicated by the reference numeral 12 directed to the undersurface of the wings, the numeral 13 directed to the undersurface of the fuselage, and the numeral 14 directed to the undersurface of the tail section, and to coat the snorkel 15 which projects from the fuselage. The aircraft would be preferably flown over the fire by autopilot or robotically.

A system for tankless plating of pure gold is known as brush-plating, or the Dalic process which is a process known to Sifco Meta Chemical Corp., of Cleveland, Ohio. Another system is known by Selectrons Limited of New York, N.Y.

The tanker aircraft 10 would fly over the damaged reactor and discharge through the snorkel a product which would cool the fire by restricting the access of oxygen to the fire. The discharge of this product through the snorkel must be made in a manner which would not result in the change of the product to a gaseous state before it was placed in a position ambient to the fire.

It is proposed that an inert gas, e.g. argon, be reduced to a liquid state and then gelled by the use of a thickening and suspending agent. Such an agent could be a "Carbopol" resin such as that available from B. F. Goodrich Chemical Company of Cleveland, Ohio. This thickening agent is a very high molecular weight, acidic polymer and the gel is made by carefully dispersing the thickening resin in the solvent and then adding the liquified inert gas. The gelled composition 19 is then placed in a casing 20 to restrict the effect of atomization by air enthalpy. The casing is formed of a tough polymeric material, such as a polycarbonate material, which is reinforced with glass or polypropylene fibers 21, 22 such that the casing maintains a tubular or an allantoic shape. This casing would have a length of approximately 18 inches and an outside diameter of about 6 inches. The casings could be formed of an extremely tough material such as a polycarbonate, e.g. polycarbonate sold under the trademark "Lexan", available from General Electric Company of Pittsfield, Mass. 01201, which has useful properties over a temperature range from $-200°$ to $+140°$ C. The casings would be placed within the tanker aircraft and positioned for withdrawal through the snorkel 15 as the aircraft passes over the damaged reactor 25. The casings would be drawn through the snorkel and then allowed to fall to the reactor. The casings would burst on impact and from the expansion resulting from the heat. The gelled liquified inert gas would soon turn to a gaseous form and fall to the lowest surfaces at the reactor site In the gaseous form the same is inert, being monatomic and unable to do disassociation, hence the cool effect and the inert gas combination would soon blanket the fire, keeping out further oxygen and result in cooling the reactor and reducing visible radiation.

The gelled liquid argon would be stored and maintained at $-400°$ F. or lower and available for discharge onto the site of the fire. The containers could be discharged through the snorkel in the cooled state. About 40 tons of the material could be handled by the aircraft 10. The aircraft would probably suffer structural damage, even at 40,000 feet, and that is why it should be radio or robotically controlled with a predetermined crash site programmed.

Having thus described the present invention with resect to a preferred embodiment, minor changes may be made to the invention without departing from the spirit or scope of the same as defined by the appended claims.

I claim:

1. The method of cooling uncontained nuclear fission by the steps of
   making sausage-shaped casings filled with gelled liquified inert gas,
   placing the casings of gelled liquid inert gas aboard a tanker aircraft,
   flying the tanker aircraft over the site of the nuclear fission,
   discharging the casings onto said site whereupon the casings discharge the gelled liquified inert gas causing the same to gasify and fall to the lowest surface in the site and restrict oxygen from reaching the lowest portion of the area surrounding the nuclear fission.

2. The method of claim 1 including the step of plating the undersurface of a tanker aircraft with a radiation reflective coating.

3. The method of claim 2 wherein said coating is gold and said plating step comprises tankless plating.

4. A product for transporting gelled inert gas comprising a casing formed of polymeric material, said casing enclosing a composition comprising a thickening agent and liquified inert gas.

5. A product as described in claim 4, wherein said inert gas is argon.

6. A product as described in claim 4, wherein said polymeric material is a polycarbonate.

7. A product as described in claim 4, wherein said polymeric material is reinforced with tough fibers.

8. A product as described in claim 6, wherein said polymeric material is reinforced with tough fibers.

* * * * *